US010534240B2

United States Patent
Iwai et al.

(10) Patent No.: US 10,534,240 B2
(45) Date of Patent: Jan. 14, 2020

(54) IMAGING CONTROL DEVICE, IMAGING CONTROL METHOD, AND RECORDING MEDIUM HAVING SAME RECORDED THEREON

(71) Applicant: Panasonic Intellectual Property Management Co., Ltd., Osaka (JP)

(72) Inventors: Hiroshi Iwai, Osaka (JP); Osamu Shibata, Hyogo (JP); Kazuko Nishimura, Kyoto (JP); Yasuo Miyake, Osaka (JP); Yoshiaki Satou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/334,422

(22) PCT Filed: Jul. 24, 2017

(86) PCT No.: PCT/JP2017/026625
§ 371 (c)(1),
(2) Date: Mar. 19, 2019

(87) PCT Pub. No.: WO2018/061427
PCT Pub. Date: Apr. 5, 2018

(65) Prior Publication Data
US 2019/0219891 A1    Jul. 18, 2019

(30) Foreign Application Priority Data
Sep. 30, 2016   (JP) ................................ 2016-193047

(51) Int. Cl.
*G03B 7/00*   (2014.01)
*G03B 7/093*  (2006.01)
(Continued)

(52) U.S. Cl.
CPC ............. *G03B 7/093* (2013.01); *G03B 15/00* (2013.01); *H04N 5/232* (2013.01); *H04N 5/2353* (2013.01); *H04N 5/353* (2013.01)

(58) Field of Classification Search
USPC ........................................................ 396/213
See application file for complete search history.

(56) References Cited

U.S. PATENT DOCUMENTS

2007/0076093 A1   4/2007  Misawa
2011/0128380 A1   6/2011  Tsuruta et al.
(Continued)

FOREIGN PATENT DOCUMENTS

JP   2001-197373   7/2001
JP   2007-104113   4/2007
(Continued)

OTHER PUBLICATIONS

International Search Report of PCT application No. PCT/JP2017/026625 dated Sep. 26, 2017.

*Primary Examiner* — Rodney E Fuller
(74) *Attorney, Agent, or Firm* — Greenblum & Bernstein, P.L.C.

(57) ABSTRACT

An imaging control device includes a controller and an input section. The controller causes an image sensor to, during at least one first frame period, capture at least one first multiple exposure image by using a first exposure signal that contains a plurality of pulses having a plurality of pulse widths different from one another; the image sensor is configured to capture an image by making multiple exposure. The input section receives the at least one first multiple exposure image. The controller selects one pulse width from the plurality of pulse widths, based on the first multiple exposure image received by the input section and then causes the image sensor to, during a second frame period, capture the image by using a second exposure signal that contains a (Continued)

pulse having the selected pulse width; the second frame period follows the first frame period.

19 Claims, 11 Drawing Sheets

(51) Int. Cl.
    *G03B 15/00*     (2006.01)
    *H04N 5/353*     (2011.01)
    *H04N 5/235*     (2006.01)
    *H04N 5/232*     (2006.01)

(56) References Cited

U.S. PATENT DOCUMENTS

2017/0230563 A1*   8/2017  Satou .................. H04N 5/2353
2019/0113332 A1*   4/2019  Nishimura ............ G01B 11/00

FOREIGN PATENT DOCUMENTS

| JP | 2009-177250 | 8/2009 |
| JP | 2011-119785 | 6/2011 |

* cited by examiner

IMAGING CONTROL DEVICE, IMAGING CONTROL METHOD, AND RECORDING MEDIUM HAVING SAME RECORDED THEREON

CROSS-REFERENCE TO RELATED APPLICATIONS

This application is a U.S. national stage application of the PCT International Application No. PCT/JP2017/026625 filed on Jul. 24, 2017, which claims the benefit of foreign priority of Japanese patent application No. 2016-193047 filed on Sep. 30, 2016, the contents all of which are incorporated herein by reference.

TECHNICAL FIELD

The present disclosure relates to an imaging control device, an imaging control method, a program, and a recording medium in which the program is stored.

BACKGROUND ART

There is an imaging device described in PTL 1 below as a conventional example of imaging control devices and other devices that make multiple exposure. This imaging device can capture images by making multiple exposure while varying its exposure period.

CITATION LIST

Patent Literature

PTL 1: Unexamined Japanese Patent Publication No. 2001-197373
PTL 2: Unexamined Japanese Patent Publication No. 2007-104113

SUMMARY OF THE INVENTION

The present disclosure provides an imaging control device, an imaging control method, a program, and a recording medium in which the program is stored, all of which make it possible to control generation of higher-quality, multiple exposure images.

An aspect of the present disclosure is intended for an imaging control device that includes a controller and an input section. The controller causes an image sensor to, during at least one first frame period, capture at least one first multiple exposure image by using a first exposure signal that contains a plurality of pulses having a plurality of pulse widths different from one another; the image sensor is configured to capture an image by making multiple exposure. The input section receives the at least one first multiple exposure image. The controller selects one pulse width from the plurality of pulse widths, based on the first multiple exposure image received by the input section and causes the image sensor to, during a second frame period, capture an image by using a second exposure signal containing a pulse having the selected pulse width; the second frame period follows the first frame period.

Another aspect of the present disclosure is intended for an imaging control method that includes: capturing at least one first multiple exposure image; receiving the at least one first multiple exposure image; selecting one pulse width; and capturing an image. The capturing of the at least one first multiple exposure image includes causing an image sensor to, during at least one first frame period, capture the at least one first multiple exposure image by using a first exposure signal that contains a plurality of pulses having a plurality of pulse widths different from one another; the image sensor is configured to capture an image by making multiple exposure. The selecting of the one pulse width includes selecting the one pulse width from the plurality of pulse widths, based on the received first multiple exposure image. The capturing of the image includes causing the image sensor to, during a second frame period, capture the image by using a second exposure signal that contains a pulse having the selected pulse width; the second frame period follows the first frame period.

Further another aspect of the present disclosure is intended for a program that causes a computer to perform a method that includes: capturing at least one first multiple exposure image; receiving the at least one first multiple exposure image; selecting one pulse width; and capturing an image. The capturing of the at least one first multiple exposure image includes causing an image sensor to, during at least one first frame period, capture the at least one first multiple exposure image by using a first exposure signal that contains a plurality of pulses having a plurality of pulse widths different from one another; the image sensor is configured to capture an image by making multiple exposure. The selecting of the one pulse width includes selecting the one pulse width from the plurality of pulse widths, based on the received first multiple exposure image. The capturing of the image includes causing the image sensor to, during a second frame period, capture the image by using a second exposure signal that contains a pulse having the selected pulse width; the second frame period follows the first frame period.

Still another aspect of the present disclosure is intended for a non-transitory recording medium in which a program is stored. The program causes a computer to perform a method that includes: capturing at least one first multiple exposure image; receiving the at least one first multiple exposure image; selecting one pulse width; and capturing an image. The capturing of the at least one first multiple exposure image includes causing an image sensor to, during at least one first frame period, capture the at least one first multiple exposure image by using a first exposure signal that contains a plurality of pulses having a plurality of pulse widths different from one another; the image sensor is configured to capture an image by making multiple exposure. The selecting of the one pulse width includes selecting the one pulse width from the plurality of pulse widths, based on the received first multiple exposure image. The capturing of the image includes causing the image sensor to, during a second frame period, capture the image by using a second exposure signal that contains a pulse having the selected pulse width; the second frame period follows the first frame period.

According to the present disclosure, it is possible to provide an imaging control device, an imaging control method, a program, and a recording medium in which the program is stored, all of which make it possible to determine a more appropriate exposure value.

DESCRIPTION OF EMBODIMENT

With reference to the accompanying drawings, a description will be given below of imaging control device 17 according to an exemplary embodiment of the present disclosure.

<1. Overall Configuration of Imaging Control Device and Peripheral Configuration>

Figure 1:
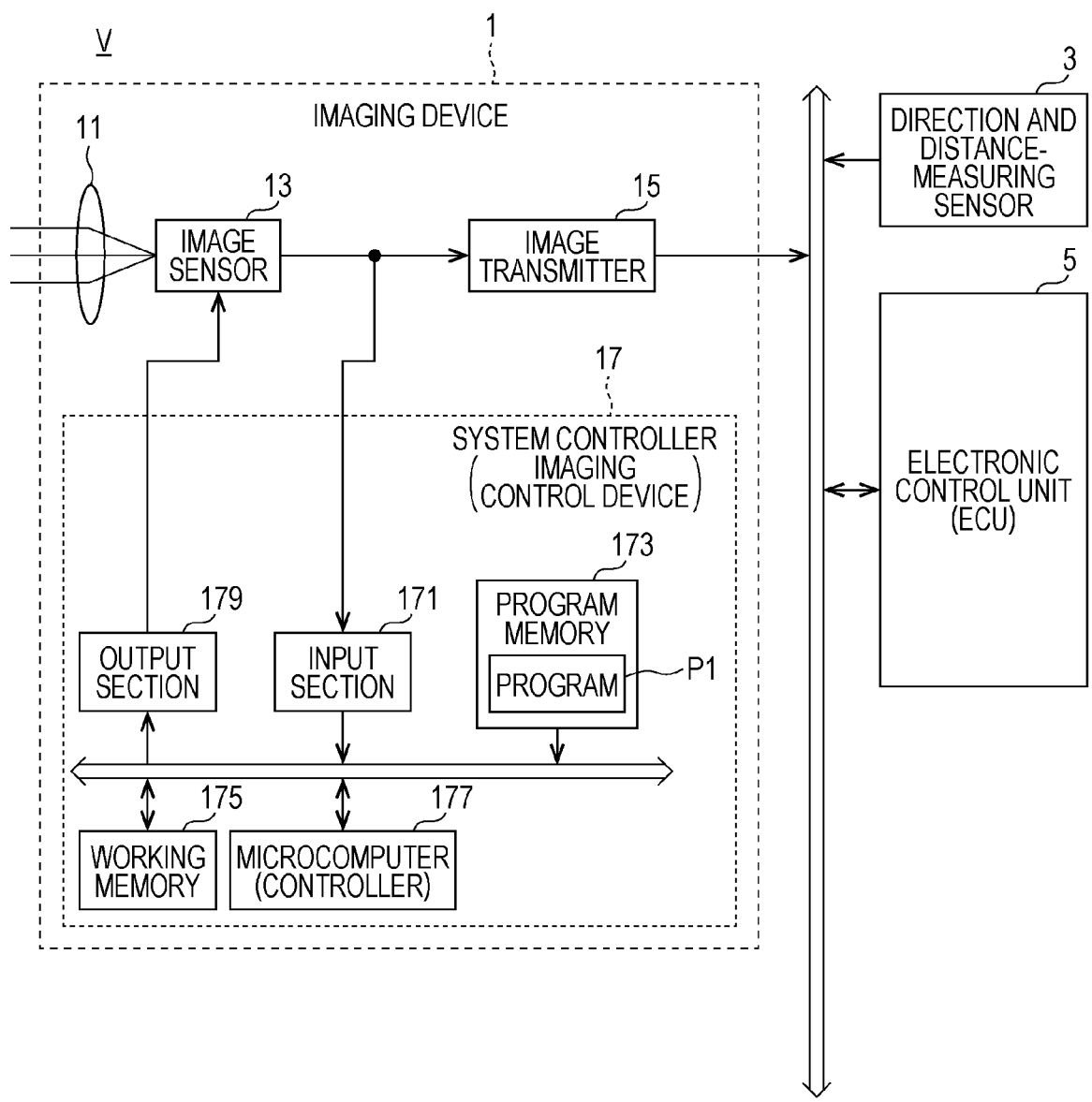
FIG. 1 is a schematic block diagram of a configuration of an imaging control device according to an exemplary embodiment of the present disclosure and a peripheral configuration.

Referring to FIG. 1, imaging device 1, direction and distance-measuring sensor 3, and electronic control unit (referred to below as ECU) 5 are communicably interconnected in vehicle V.

<1-1. Configuration of Imaging Device>

Imaging device 1 is disposed in vehicle V at or near the right-front corner. For example, imaging device 1 can capture images with a wide field of view containing right-front and right-side areas of vehicle V. Imaging device 1 includes optical system 11, image sensor 13, image transmitter 15, and system controller 17.

Optical system 11 has a known group of lenses. Of this group of lenses, for example, a focusing lens is movable along an optical axis so as to be able to adjust a focus position of image sensor 13 on a subject image.

Figure 2A:
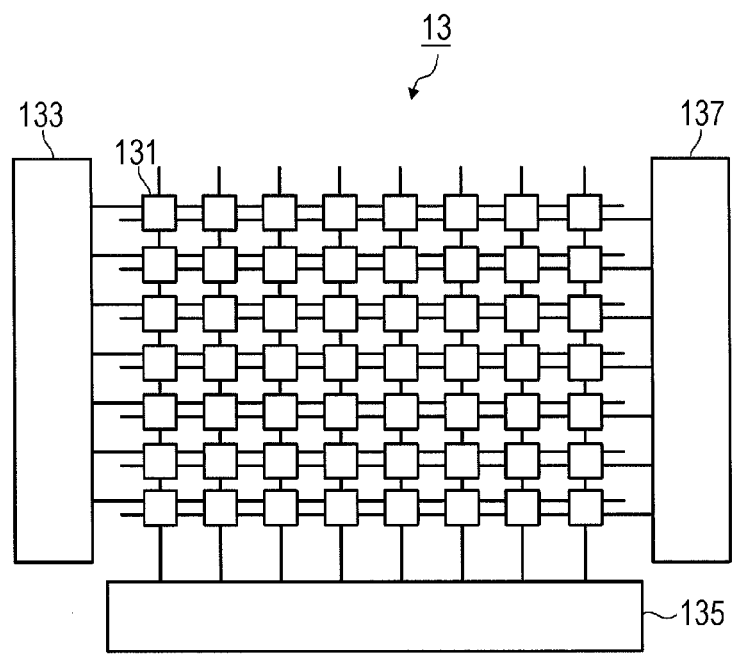
FIG. 2A is a schematic block diagram of a configuration of the image sensor in FIG. 1.

Image sensor 13 may be a complementary metal oxide semiconductor (CMOS) image sensor. As illustrated in FIG. 2A, image sensor 13 includes: a plurality of pixels 131 arrayed in a matrix fashion (pixel arrays); row scanning circuit 133; column scanning circuit 135; and voltage control circuit 137. Pixels 131 are individually electrically connected to row scanning circuit 133 via signal lines and also individually electrically connected to column scanning circuit 135 via signal lines. Details of voltage control circuit 137 will be described later. It should be noted that reference numeral 131 is assigned only to a single pixel, for better viewability of FIG. 2A.

Figure 2B:
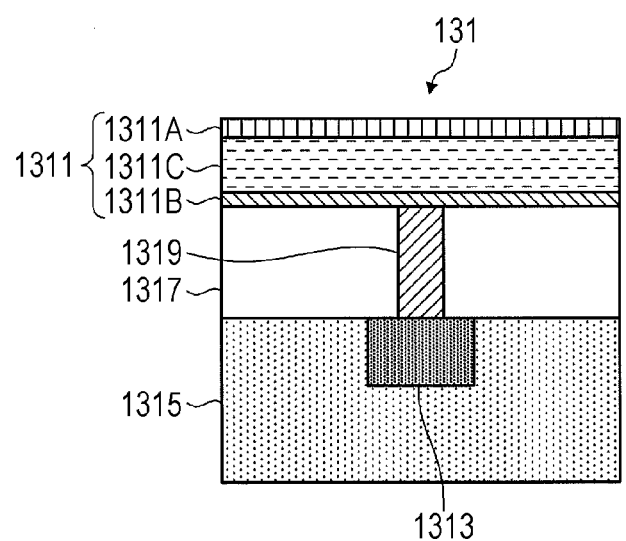
FIG. 2B is a schematic cross-sectional view of a structure of a unit pixel in FIG. 2A.

As illustrated in FIG. 2B, each of pixels 131 includes: photoelectric converter 1311 that photoelectrically converts incident light; and charge detection circuit 1313, as main components.

Photoelectric converter 1311 includes: transparent electrode 1311A; pixel electrode 1311B; and photoelectric conversion layer 1311C formed between transparent electrode 1311A and pixel electrode 1311B. For example, photoelectric conversion layer 1311C may be an organic thin film made from tin naphthalocyanine.

Charge detection circuit 1313, which is provided inside semiconductor substrate 1315, is electrically connected to pixel electrode 1311B via contact plug 1319 formed inside interlayer insulating layer 1317. Charge detection circuit 1313 configured above detects a signal charge generated in photoelectric converter 1311.

If light enters photoelectric conversion layer 1311C described above, when a bias voltage is applied between transparent electrode 1311A and pixel electrode 1311B, either positive or negative charge is generated as a result of the photoelectric conversion and collected by pixel electrode 1311B. Then, the collected charge is accumulated in charge detection circuit 1313. The inventors and others have acquired a finding in which, by using photoelectric conversion layer 1311C for photoelectric converter 1311 and considerably decreasing the electric potential difference between transparent electrode 1311A and pixel electrode 1311B, it is possible to suppress a signal charge already accumulated in charge detection circuit 1313 from traveling to transparent electrode 1311A through photoelectric conversion layer 1311C and also to suppress the signal charge from being further accumulated in charge detection circuit 1313 after the electric potential difference is decreased. In short, by controlling the magnitude of the bias voltage applied to photoelectric conversion layer 1311C, it is possible to achieve a global shutter function without providing additional elements, such as transfer transistors, for respective pixels, as opposed to the conventional art.

In image sensor 13 configured above, the plurality of pixels 131 can acquire multiple pieces of captured image data, the common display attributes of which differ in degree from one another, at different timings within each individual frame period, which is a predetermined repetition period. Then, image sensor 13 can generate multiple exposure image data by multiplexing the pieces of captured image data. Charge detection circuit 1313 in each pixel 131 can read the generated multiple exposure image data and then outputs the multiple exposure image data to both image transmitter 15 and system controller 17. Alternatively, image sensor 13 can generate single exposure image data, instead of the multiple exposure. Details of the common display attribute will be described later.

FIG. 1 is referenced again. Image transmitter 15 outputs the multiple exposure image data and other data to the outside (for example, ECU 5). In this case, the multiple exposure image data and other data to be output may be raw data that has not been subjected to any processing, such as compression processing, or may be subjected to any image processing, such as image compression processing.

System controller 17 includes, as main components, input section 171, program memory 173, working memory 175, imaging-device-side microcomputer 177, and output section 179.

Input section 171 can receive the multiple exposure image data.

Microcomputer 177 executes program P1 prestored in program memory 173 while using working memory 175, thereby functioning as a controller for imaging control device 17. In addition to functioning as imaging control device 17, system controller 17 controls entire imaging device 1. However, persons associated with the present disclosure may have no interests in this function, and thus details will not be described.

<1-2. Basic Operation of Imaging Device>

Next, with reference to FIGS. 3 to 5, a description will be given of a basic operation of imaging device 1.

Figure 3:
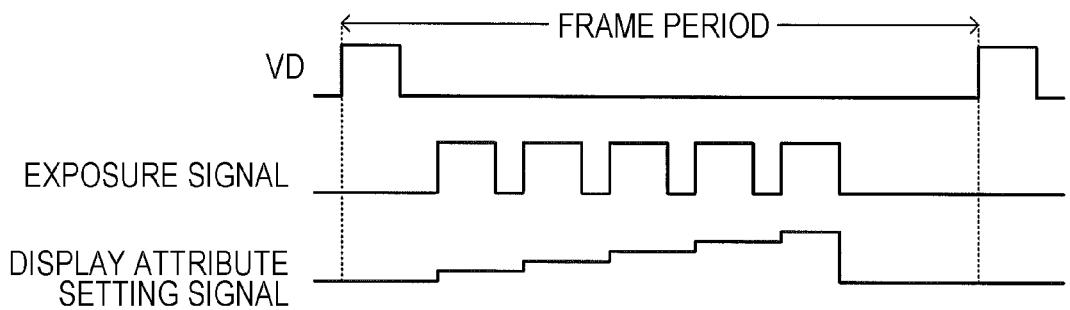
FIG. 3 is a diagram illustrating a typical operation timing of multiple exposure in a frame period.

FIG. 3 is a diagram illustrating a typical operation timing of multiple exposure in a frame period. In this case, this frame period is repeated.

In FIG. 3, character VD denotes a start pulse of the frame period.

The exposure signal contains pulses each of which indicates whether the exposure is valid or invalid. In the present disclosure, the high (referred to below as Hi) periods correspond to exposure periods (exposure states) in each of which photoelectric conversion layer 1311C is exposed to light. The low (referred to below as Low) periods correspond to non-exposure periods (non-exposure states). In the present disclosure, each of the pulse widths contained in the exposure signal is variable in the frame period, in order to vary its exposure period.

The display attribute setting signal is a signal for use in setting the degree of common display attribute. The display attribute setting signal having a greater pulse amplitude indicates a higher degree of common display attribute.

Alternatively, the exposure signal and the display attribute setting signal may be a single signal that has both functions.

In the present disclosure, the common display attribute is at least one of brightness and color. The brightness is a lightness value obtained from an RGB signal of each pixel cell, whereas the color is hue or chroma acquired from the RGB signal.

In a typical case, the exposure signal and the display attribute setting signal may be control signals generated by system controller 17.

FIG. 3 illustrates an example in which the exposure is made five times within one frame period. Image sensor 13 accumulates and multiplexes multiple pieces of captured image data acquired through the exposure, thereby creating the multiple exposure image data. In this multiple exposure image data, images of a stationary subject, such as background images, are captured by the same pixel 131 in the pixel array (see FIG. 2) during each individual exposure period. Then, the image data is accumulated by the same pixel 131.

In contrast, images of a subject moving in the frame period may be captured by different pixels 131 during respective exposure periods. As a result, if different pixels 131 are related to the image capturing in the respective five exposure processes, five independent images of the subject are synthesized in the multiple exposure image data.

By individually performing the exposure processes while varying the degree (for example, a lightness value) of common display attribute in accordance with the display attribute setting signal, it is possible to vary the degree (for example, a lightness value) of common display attribute of captured image data acquired during each exposure period. As a result, the five images of the moving subject in the multiple exposure image data have different degrees of common display attribute.

Figure 4:
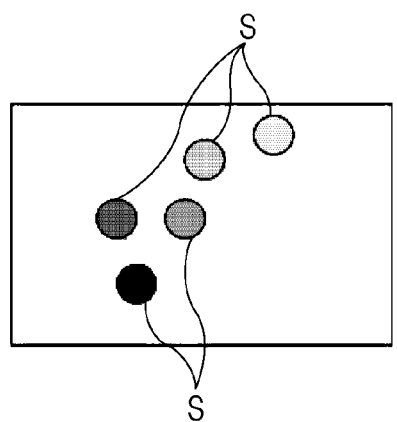
FIG. 4 is a schematic view of an example of subject images (namely, moving object images) S appearing in multiple exposure image data.

FIG. 4 schematically illustrates an example of subject images (namely, moving object images) S appearing in the multiple exposure image data. In FIG. 4, the difference between the degrees of common display attribute is expressed by a lightness value. FIG. 4 indicates that a subject image having a greater lightness value corresponds to be a newer subject image in time sequence. In this case, the time-variation in the degree of common display attribute is preferably a monotonic increase or a monotonic decrease.

In the present disclosure, the sensitivity per unit time of each pixel 131 can also be set differently for the individual exposure processes in the frame period. In this way, it is possible to vary brightness and color information among the exposure processes. More specifically, by varying the electric potential difference between transparent electrode 1311A and pixel electrode 1311B (see FIG. 2B) in photoelectric converter 1311, the sensitivity can be set differently for the individual exposure processes. Details of how to differently set the sensitivity are described in PTL 2, for example, and thus will not be described herein.

By decreasing the electric potential difference between transparent electrode 1311A and pixel electrode 1311B (see FIG. 2B) to the extent that a charge generated as a result of the photoelectric conversion is not detected, it is also possible to set the sensitivity to approximately zero. This scheme can achieve a global shutter operation.

Image sensor 13 includes voltage control circuit 137, which varies the degree of common display attribute, based on a control signal indicating the degree of common display attribute. The plurality of pixels 131 are electrically connected to voltage control circuit 137 via photoelectric conversion film control lines. More specifically, electric potentials of pixel electrodes 1311B are equal to electric potentials of corresponding charge detection circuits 1313. The photoelectric conversion film control lines are electrically connected to transparent electrodes 1311A. Voltage control circuit 137 applies a predetermined electric potential to transparent electrode 1311A, based on the control signal indicating the degree of common display attribute.

Figure 5:
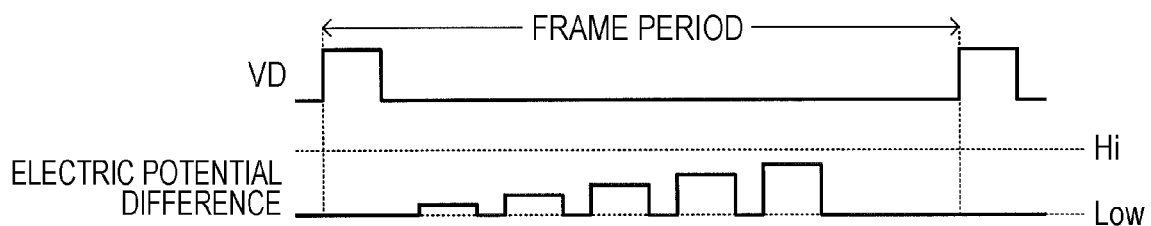
FIG. 5 is a schematic diagram illustrating an electric potential difference between the transparent electrode and the pixel electrode which varies during multiple exposure in the frame period.

FIG. 5 schematically illustrates a state in which an electric potential difference between transparent electrode 1311A and pixel electrode 1311B varies (in other words, a voltage applied to transparent electrode 1311A varies) during the multiple exposure in the frame period.

In the example of FIG. 5, the degree of common display attribute corresponds to the electric potential difference between transparent electrode 1311A and pixel electrode 1311B. As a signal for use in setting the electric potential difference has an increased pulse amplitude, the electric potential difference increases. The exposure time is indicated by a pulse width.

In the illustrated electric potential difference, the Low level corresponds to a level in which the photoelectric conversion is not made. In other words, the Low level corresponds to a level in which a global shutter operation is possible. Levels other than the Low level correspond to an enough level to make the photoelectric conversion. The Hi level corresponds to a level in which the photoelectric conversion is maximally made. Thus, in each pixel 131, a greater electric potential difference results in a higher sensitivity. A cycle containing the Low level and other electric potential difference levels is repeated multiple times. Multiple exposure image capturing is thereby performed. By differently setting the electric potential differences for image captures, the sensitivities for respective exposure periods differ from one another.

As described above, by differently setting the electric potential difference between transparent electrode 1311A and pixel electrode 1311B for the respective exposure processes within the frame period and by performing the global shutter operation, it is possible to both make multiple exposure and vary sensitivity for image capturing. As a result, it is possible to independently and differently set the degrees of common display attribute (more specifically, a lightness value) for respective exposure processes within one frame period. This makes it possible to check a time-sequential movement of a subject image in the multiple exposure image data.

<1-3. Details of Technical Problem>

As described above, image sensor 13 of the present disclosure enables a time-sequential movement of a subject image in the multiple exposure image data to be checked. However, image sensor 13 may cause an exposure shortage or overexposure, depending on an exposure value determined by an exposure time that is indicated by a pulse amplitude or pulse width of an exposure signal within the frame period. The exposure shortage or overexposure might hinder the subject image from being checked clearly.

The present disclosure aims to provide imaging control device 17 and any other devices that can appropriately set an exposure value.

<1-4. Specific Process Performed by Imaging Control Device>

Next, with reference to FIG. 6, a description will be given of a specific process performed by imaging control device 17.

After starting to execute program P1, first, microcomputer 177 determines whether a timing for determining an exposure value has come (Step S001).

An example of the determination method at Step S001 will be described below. As a first example, microcomputer 177 may determine the coming of the timing, depending on whether a given length of time has passed since the last time when the exposure value is determined. As a second example, microcomputer 177 may determine the coming of the timing, depending on whether a preset time has come. In either case, the exposure value is preferably predetermined at proper time intervals, because an exposure shortage or overexposure may be caused due to an irradiation of an area containing a subject.

When selecting NO at Step S001, microcomputer 177 performs the process at Step S017.

Figure 7:
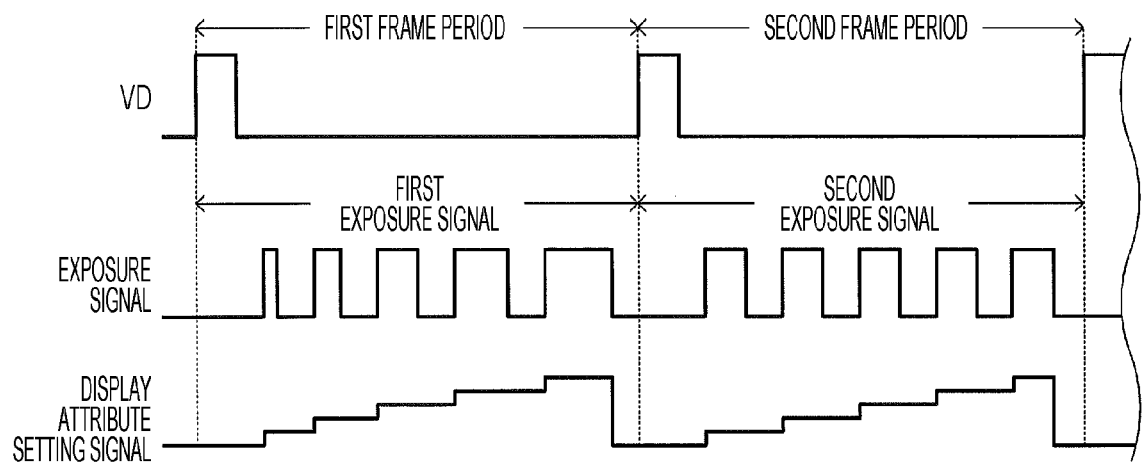
FIG. 7 is a schematic diagram illustrating a time waveform of a first example of a first exposure signal.

When selecting YES at Step S001, microcomputer 177 generates a first exposure signal (see FIG. 7) as a first example of the exposure signal (Step S003). FIG. 7 is a timing chart of frame periods repeated multiple times, more specifically a timing chart of making exposure with a plurality of pulses within each frame period. Of these frame periods, one corresponding to a timing of determining an exposure value is referred to as a first frame period. At least one of frame periods that follow the frame period corresponding to the timing of determining an exposure value is referred to as a second frame period. In FIG. 7, the first exposure signal contains a plurality of pulses having different pulse widths in the first frame period. The pulse widths in this case may be either the same as or different from the pulse widths set at the last time when the process at Step S003 is performed. The plurality of pulses illustrated in FIG. 7 have the same pulse amplitude but different duty ratios.

Figure 8:
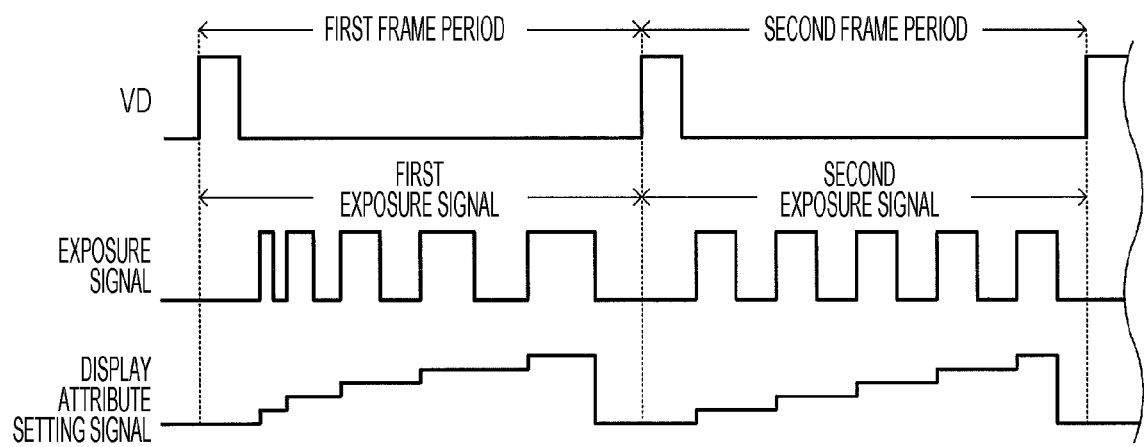
FIG. 8 is a schematic diagram illustrating a time waveform of a second example of the first exposure signal.

As opposed to the state illustrated in FIG. 7, the first exposure signal may contain a plurality of pulses having different pulse widths but the same pulse amplitude and duty ratio in the frame period, as illustrated in FIG. 8.

Then, microcomputer 177 generates a display attribute setting signal, examples of which are illustrated in FIGS. 7 and 8 (Step S005). More specifically, the display attribute setting signal has different amplitude levels in the respective pulse periods of the first exposure signal.

Microcomputer 177 outputs the generated first exposure signal and display attribute setting signal to voltage control circuit 137 via output section 179 at Step S007.

Voltage control circuit 137 switches the received display attribute setting signal by using the received first exposure signal. In other words, voltage control circuit 137 outputs the received display attribute setting signal when the received first exposure signal has a Hi period. Voltage control circuit 137 performs the switching operation in this manner to generate a voltage signal (see a left area of an upper part of FIG. 9) and simultaneously applies this voltage signal between transparent electrodes 1311A and pixel electrodes 1311B in all pixels 131 (global shutter function). In the present disclosure, the pulse width of each pulse in the voltage signal indicates an exposure time, and the pulse amplitude indicates a lightness value.

Image sensor 13 performs the global shutter operation by applying the voltage to all pixels 131, so that the exposure process simultaneously starts and ends in all pixels 131 in the frame period. Image sensor 13 reads a signal charge accumulated in each pixel 131 with row scanning circuit 133 and column scanning circuit 135. Then, image sensor 13 outputs first multiple exposure image data, as the first example of the multiple exposure image data. The output first multiple exposure image data is stored in working memory 175 through input section 171. In this way, microcomputer 177 acquires the first multiple exposure image data (Step S009).

Figure 10:
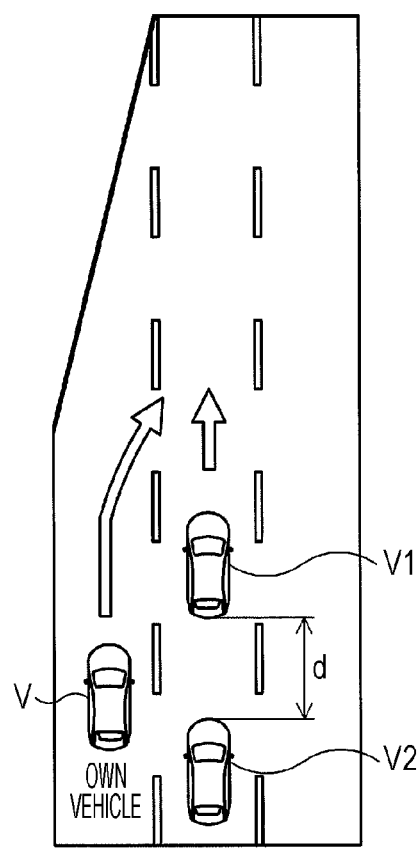
FIG. 10 is a schematic view of a vehicle moving from a sub-lane into a main lane of an expressway.

FIG. 10 illustrates vehicle V moving from a sub-lane into a main lane of an expressway. In this case, a plurality of vehicles (leading vehicle V1 and following vehicle V2) with their head lamp and tail lamp lighted are running along the main lane on the right side of vehicle V running along the sub-lane. Further, both leading vehicle V1 and following vehicle V2 are running at a higher speed than a running speed of vehicle V and thus have a relative speed. In the first multiple exposure image data acquired in this situation, for example, a tail lamp of the leading vehicle appears as a first moving object, and a head lamp of the following vehicle appears as a second moving object.

As described above, the pulse amplitude monotonically increases, for example, every time the exposure process is performed in the frame period. This means that, when exposure times are determined, the lightness value of each image of the first moving object in the first multiple exposure image data indicates what number a corresponding image has been exposed.

When the exposure times are determined, the exposure times differ from each other in the frame period. Images of the first moving object which appear in the first multiple exposure image data thus have different exposure levels. If overexpose occurs, a corresponding image may be blurred. If an expose shortage occurs, a corresponding image may appear darkly.

The above properties are true of a lightness value and an exposure level of the second moving object.

Microcomputer 177 detects a plurality of images of the first moving object which have different lightness values and different exposure times, from the acquired first multiple exposure image data. Alternatively, microcomputer 177 detects a plurality of images of the second moving object (Step S011).

Microcomputer 177 then performs an edge detection on the detected images of the first moving object (or the second moving object) and selects the image, the lightness of which varies most sharply on the boundary of the surrounding area (Step S013).

The lightness order of the images of the first moving object (or the second moving object) is uniquely related to an exposure time. Microcomputer 177 determines an exposure time for an image of the first moving object (or the second moving object) which has been selected at Step S013, based on the lightness order of the image (Step S015). The exposure time determined in this manner can be regarded as the optimum exposure time according to the present irradiation.

After Step S015, microcomputer 177 generates a second exposure signal (see FIG. 7) as a second example of the exposure signal (Step S017). More specifically, referring to FIG. 7, the second exposure signal contains a plurality of pules, each with the pulse width determined at Step S015, in the second frame period.

Microcomputer 177 then generates a display attribute setting signal, for example, as described at Step S005 (Step S019).

Microcomputer 177 outputs the generated second exposure signal and display attribute setting signal to voltage control circuit 137 through output section 179 (Step S021).

Figure 9:
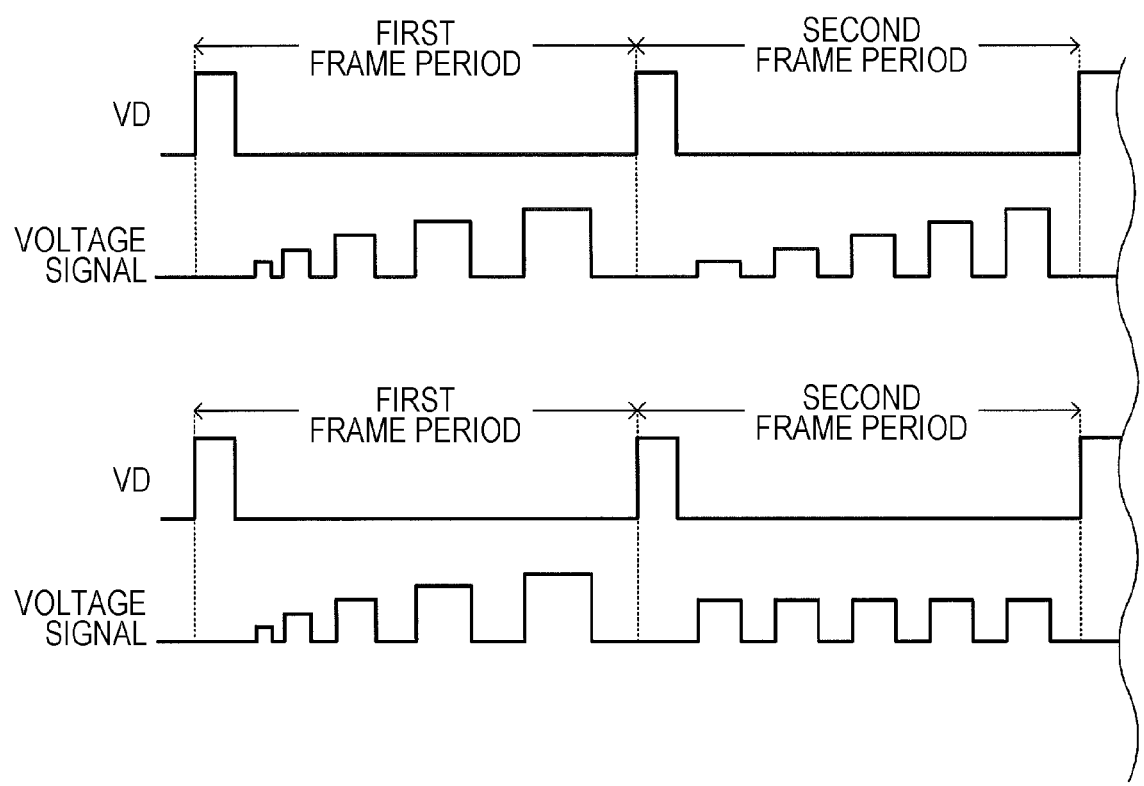
FIG. 9 is a diagram illustrating time waveforms of first and second examples of a voltage signal in the second frame period.

Voltage control circuit 137 switches the received display attribute setting signal by using the received second exposure signal to generate a voltage signal (see a right area of an upper part of FIG. 5 or 9). Then, voltage control circuit 137 simultaneously applies this voltage signal between transparent electrodes 1311A and pixel electrodes 1311B in all pixels 131 (global shutter function).

FIG. 9 illustrates, in a right area of an upper part, the voltage signal, the pulse amplitude of which monotonically increases in the second frame period. However, the waveform of the voltage signal is not limited to this example. Alternatively, as illustrated in a right area of a lower part of FIG. 9, the voltage signal with a substantially constant pulse amplitude may be simultaneously applied to all pixels 131 in the second frame period.

Image sensor 13 performs the global shutter operation by applying the voltage to all pixels 131, so that the exposure process simultaneously starts and ends in all pixels 131 in the second frame period. Image sensor 13 reads a signal charge accumulated in each pixel 131 with row scanning circuit 133 and column scanning circuit 135. Then, image sensor 13 outputs second multiple exposure image data, as the second example of the multiple exposure image data. The output second multiple exposure image data is transmitted to ECU 5 through image transmitter 15 (Step S023).

After Step S023 described above, microcomputer 177 resumes the process at Step S001.

<1-5. Function and Effect>

As illustrated in FIG. 10, leading vehicle V1 and following vehicle V2 with their head lamp and tail lamp lighted are running along the main lane on the right side of vehicle V running along the sub-lane. In the second multiple exposure image data acquired in this situation, for example, a tail lamp of leading vehicle V1 appears as the first moving object, and a head lamp of the following vehicle V2 appears as the second moving object. Since each exposure time is set optimally in the second frame period as described above, the first and second moving objects in the second multiple exposure image data are exposed over optimum exposure times. As a result, light and shade can be reproduced appropriately.

With the global shutter function, image sensor 13 can provide a second multiple exposure image data in which a low-distorted, high-speed moving object appears even if capturing an image of the object moving at a high speed.

Imaging control device 17 in the present disclosure is suitable especially for vehicular applications, because imaging control device 17 determines an optimum exposure time within a single frame period. A reason is that, if an exposure time is determined over a plurality of frame periods, this exposure time is usually no longer an optimum exposure time at the time of the determination, because a traffic environment in which own vehicle V and a nearby vehicle are running at high speeds may change dynamically.

In the present disclosure, as described above, it is possible to determine an exposure time multiple times. For this purpose, imaging control device 17 can set an optimum exposure time appropriately in accordance with an irradiation environment of running vehicle V which may change with time.

<2. Peripheral Configuration of Imaging Control Device>

With reference to FIG. 1, direction and distance-measuring sensor 3 will be described. Direction and distance-measuring sensor 3 is disposed at or near the right-front corner of vehicle V so as to cover a field of view containing right-front and right-side areas of vehicle V. For example, direction and distance-measuring sensor 3 detects at least a direction and distance to a target, such as leading vehicle V1 or following vehicle V2, and outputs the detected direction and distance to ECU 5.

More specifically, to detect the direction and distance to the target, direction and distance-measuring sensor 3 radiates a signal formed of an radio wave, sound wave, infrared light, or near-infrared light, for example, to within the field of view and then processes a return signal reflected or scattered by and returned from the target. Direction and distance-measuring sensor 3 of this type may be a Doppler radar, a time-of-flight (TOF) type radar, or a light detection and ranging (LIDAR).

Alternatively, direction and distance-measuring sensor 3 may be a stereo camera.

To simplify the process performed by ECU 5, imaging device 1 and direction and distance-measuring sensor 3 preferably have a fixed positional relationship.

Next, ECU 5 illustrated in FIG. 1 will be described.

Figure 11:
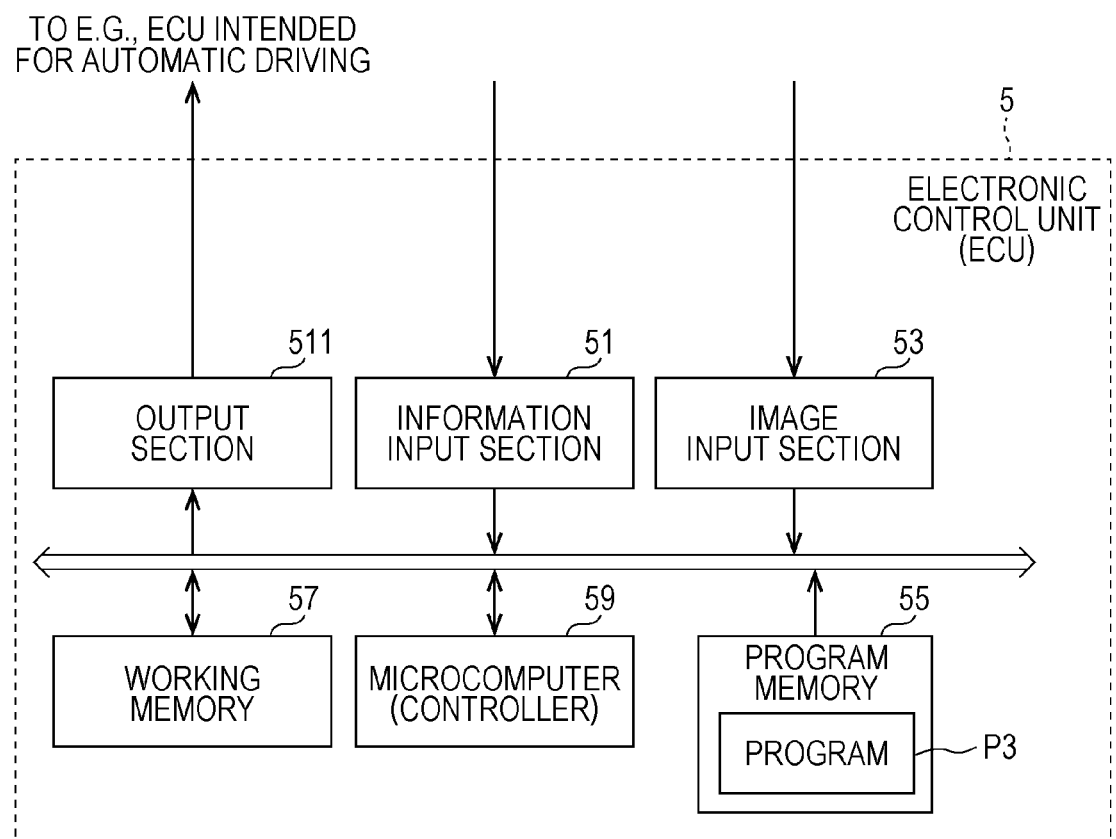
FIG. 11 is a block diagram of a detailed configuration of the electronic control unit (ECU) in FIG. 1.

As illustrated in FIG. 11, ECU 5 includes, as main components, information input section 51, image input section 53, program memory 55, working memory 57, ECU-side microcomputer 59, and ECU-side output section 511.

For example, information input section 51 may be an interface of a control area network (CAN). Information input section 51 receives information indicating the direction and distance to each individual target, from direction and distance-measuring sensor 3.

For example, image input section 53 may be an interface of media oriented systems transport (MOST). Image input section 53 receives at least the second multiple exposure image data from imaging device 1.

Under the control of microcomputer 59, the information received by information input section 51 and the second multiplex image data received by image input section 53 are transferred to working memory 57.

Microcomputer 59 executes program P3 prestored in program memory 55 while using working memory 57, thereby functioning as a controller for ECU 5.

Microcomputer 59 estimates vehicular spacing d between leading vehicle V1 and following vehicle V2 and moving speeds of leading vehicle V1 and following vehicle V2 in the scene illustrated in FIG. 10, more specifically in the scene where leading vehicle V1 and following vehicle V2 are running along the main lane of the expressway in front of and in the rear of, respectively, a position at which vehicle V attempts to move from the sub-lane into the main lane.

In this case, microcomputer 59 performs an edge detection, for example, on the received second multiplex image data for one frame to recognize the first moving object (namely, the tail lamp of leading vehicle V1) and the second moving object (namely, the head lamp of following vehicle V2). Then, microcomputer 59 accurately estimates a distance between leading vehicle V1 and following vehicle V2 as vehicular spacing d. Further, microcomputer 59 may use information received from direction and distance-measuring sensor 3 for the distances between vehicle V and first moving object and between vehicle V and second moving object.

Microcomputer 59 can also detect time-variations in moving speeds of leading vehicle V1 and following vehicle V2 and vehicular spacing d, because a plurality of images of each of the first and second moving objects appear in second multiplex image data.

In the above case, as described above, image sensor 13 captures an image over an optimum exposure time through the global shutter function. The resultant images are therefore minimally burred and distorted in the received second multiplex image data. This is how, microcomputer 59 can detect vehicular spacing d accurately.

Moreover, in the present disclosure, microcomputer 59 can process the received second multiplex image data for one frame to provide vehicular spacing d. In other words, microcomputer 59 can provide vehicular spacing d without waiting for multiple frames of images from imaging device 1. According to the present disclosure, it is thus possible to provide vehicular spacing d in a relatively short time.

Microcomputer 59 transfers vehicular spacing d provided in the above manner and other information to an ECU intended for automatic driving, for example, through ECU-side output section 511. Based on the received vehicular spacing d, for example, the ECU intended for automatic driving controls the steering, accelerator, and brake of vehicle V so as to guide vehicle V to the main lane of the expressway.

<3-1. Remark (Pulse Width and Pulse Period with Regard to Relative Speed)>

As described above, the first exposure signal contains a plurality of pulses having different pulse widths in the first frame period. If imaging device 1 is used for a vehicular application as in the present disclosure, the pulse widths are preferably set based on running speeds of own vehicle V and nearby vehicles to be targeted (leading vehicle V1 and following vehicle V2). Furthermore, the pulse widths in the first exposure signal are preferably selected based on relative speeds between own vehicle V and target vehicles V1, V2. Image sensor 13 thereby captures images of subjects (namely, nearby vehicles) over a more suitable exposure time. As a result, microcomputer 59 can estimate a vehicular spacing and moving speed more accurately.

The pulse periods in the first exposure signal are preferably set based on running speeds of own vehicle V and nearby vehicles to be targeted (leading vehicle V1 and following vehicle V2). Furthermore, the pulse periods in the first exposure signal are preferably selected based on relative speeds between own vehicle V and target vehicles V1, V2. Image sensor 13 thereby can adjust a spacing between the images of subjects (namely, nearby vehicles) in the first multiple exposure image data, thus facilitating the edge detection, for example. As a result, microcomputer 59 can estimate a vehicular spacing and moving speed more accurately.

<3-2. Remark (Pulse Width and Pulse Period with Regard to Irradiation)>

There are cases where nearby vehicles (leading vehicle V1 and following vehicle V2) are too bright or too dark as seen from vehicle V, under a certain condition. In other words, there are cases where an irradiation condition of an area containing the nearby vehicles is not good. For this reason, microcomputer 177 preferably varies the pulse widths and pulse periods of the first exposure signal appropriately in accordance with the irradiation condition of the area containing the nearby vehicles (for example, in accordance with a position of the sun relative to own vehicle V).

<3-3. Remark (Multiple Exposure for Each Notable Region)>

If imaging device 1 is used for a vehicular application as in the present disclosure, it is important to determine for which region image sensor 13 should apply multiple exposure, because own vehicle V is also running Which region is to be noted by imaging device 1 depends on a running scene of vehicle V. If vehicle V is running straight ahead at a high speed, a notable region for imaging device 1 is positioned in the forward direction. If vehicle V is turning right, a notable region for imaging device 1 is positioned in the right direction. Thus, in the process of FIG. 6, microcomputer 177 may narrow down all pixels 131 possessed by image sensor 13 to a plurality of pixel 131 that receive light from this notable region. Then, microcomputer 177 may perform the global shutter function to simultaneously supply the first and second exposure signals to all of the narrowed pixels 131. In this case, microcomputer 177 preferably further detects a plurality of images of at least one of the first and second moving objects from the notable region in the first multiple exposure image data. In this case, for example, microcomputer 177 may identify the notable region by using a vehicular steering angle sensor (not illustrated) that can detect a moving direction of vehicle V.

A description will be given below of another example of a method of determining the above notable region. For example, microcomputer 177 may acquire an image from image sensor 13 or a stereo camera, which serves as direction and distance-measuring sensor 3, and may perform the edge detection on the acquired image. Then, microcomputer 177 may regard a region in which a target moving object is present, as the notable region. After that, during the subsequent first or second frame period, microcomputer 177 may narrow down all pixels 131 possessed by image sensor 13 to a plurality of pixels 131 that receive light from the notable region. Then, microcomputer 177 may perform the global shutter function to simultaneously supply the first and second exposure signals to all of the narrowed pixels 131. In this case, microcomputer 177 may further detect a plurality of images of the first or second moving object from the notable region in the first multiple exposure image data.

In the scene illustrated in FIG. 10 as in the present disclosure, the notable region is preferably positioned at or near the tail lamp of leading vehicle V1 or the head lamp of following vehicle V2 that are running the traffic lane into which vehicle V attempts to move.

<3-4. Remark (Another Frame Period)>

As can be understood from FIGS. 7 and 8, the multiple exposure is also made during the second frame period in the above exemplary embodiment. Instead of making the multiple exposure in the second frame period, however, microcomputer 177 may generate a second exposure signal that contains a single pulse having an exposure time determined at Step S015 in FIG. 6, during the second frame period, as illustrated in upper and lower parts of FIG. 12. In this case, image sensor 13 may provide single exposure image data.

Figure 12:
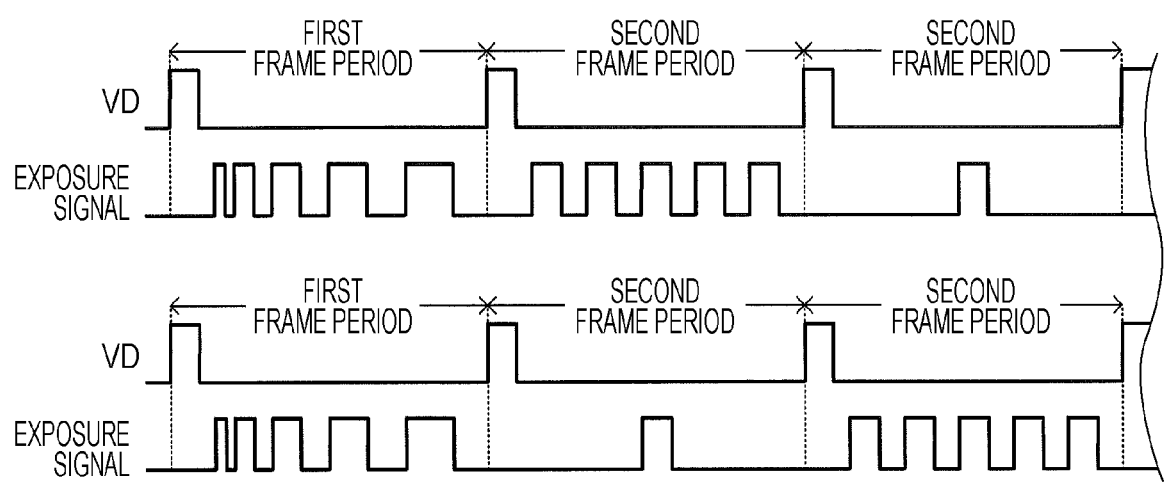
FIG. 12 is a schematic diagram illustrating time waveforms of exposure signals in a third unit frame.

As illustrated in the upper part of FIG. 12, microcomputer 177 may determine an optimum exposure time during the first frame period and then may make multiple exposure over the determined exposure time during the second frame period. After that, microcomputer 177 may make single exposure during the second frame period following the multiple exposure. As illustrated in the lower portion of FIG. 12, microcomputer 177 may determine an optimum exposure time during the first frame period and then may make single exposure over the determined exposure time during the second frame period. After that, microcomputer 177 may make multiple exposure during the second frame period following the second frame of the single exposure.

<3-5. Remark (Pilot Frame Period)>

Figure 6:
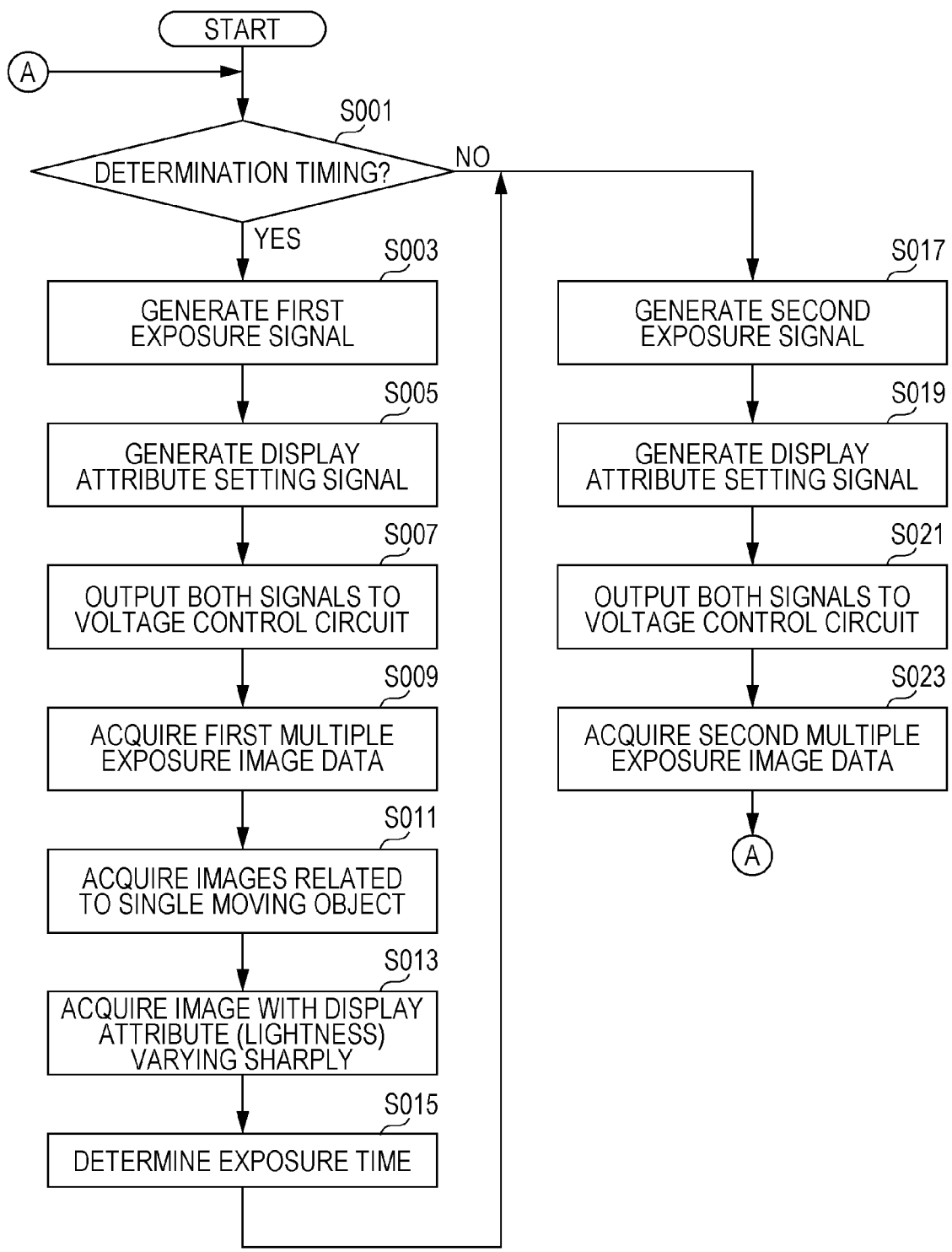
FIG. 6 is a flowchart of a process performed by the imaging control device in FIG. 1.
Figure 13:
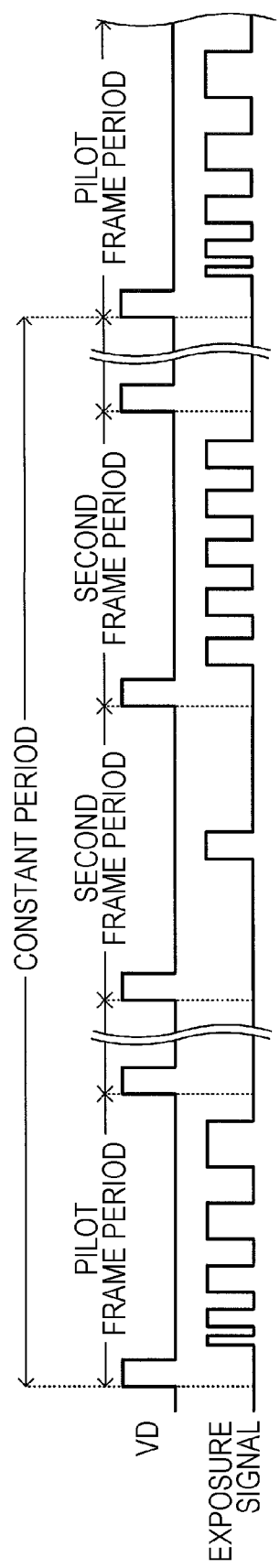
FIG. 13 is a schematic diagram illustrating a first frame period and a second frame period interposed between a plurality of pilot frame periods.

Microcomputer 177 regularly performs the processes at Steps S003 to S015 in FIG. 6. The regularly and repeatedly appearing first frame period is referred to as the pilot frame period. As illustrated in FIG. 13, microcomputer 177 may determine an optimum exposure time by using the first exposure signal during a time interval between a plurality of such pilot frame periods. Then, microcomputer 177 may acquire the second multiple exposure image data (or the single exposure image date) from image sensor 13 by using the second exposure signal, which is a signal for use in making multiple or single exposure, during the subsequent second frame period (or further continuing second frame period).

<3-6. (Other) Remarks>

When provided, program P1 may be stored in a non-transitory recording medium, such as a digital versatile disc (DVD). Alternatively, program P1 may be stored in a server on a network so as to be downloadable over the network.

In the foregoing exemplary embodiment, microcomputer 177 executes program P1. However, the present disclosure is not limited to this scheme; alternatively, ECU-side microcomputer 59 may execute program P1.

<4-1. First Modification>

In the foregoing disclosure, as illustrated in FIGS. 7 and 8, the exposure signal (namely, first exposure signal) contains a plurality of pules in the first frame period, and these pulses have the same pulse amplitude.

However, the present disclosure is not limited to this scheme; if the pulses in the first exposure signal have first pulse width w1, second pulse width w2 (w2>w1), ... and n-th pulse width wn (wn>w (n−1)) in time sequence, there are cases where corresponding first pulse amplitude a1, second pulse amplitude a2, ... and n-th pulse amplitude an are preferably set to satisfy the relationship: a1<a2, ... and a (n−1)<an.

A narrower pulse width means a lower exposure value; a greater pulse amplitude means a higher exposure value. Therefore, if a pulse has a relatively narrow pulse width and a relatively great pulse amplitude, an exposure value may be constant between pulses. For this reason, as described above, there are cases where, if any pulse in the first exposure signal has a narrow pulse width, a pulse amplitude of this pulse is preferably small.

The pulse amplitude of the second exposure signal is set to the maximum value over the second frame period unless the sun is present in the background.

<4-2. Second Modification>

Figure 14:
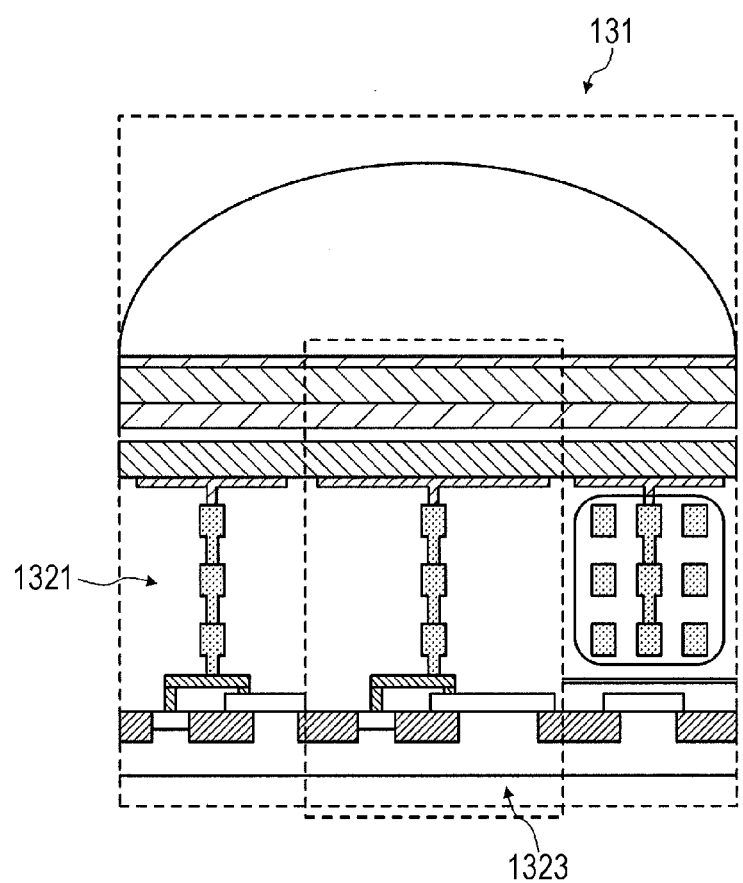
FIG. 14 is a schematic cross-sectional view of another example of a structure of the unit pixel in FIG. 2A.

In the foregoing exemplary embodiment, each pixel 131 in image sensor 13 may have two cells with sensitivities according to bright and dark scenes, in order to achieve a wide dynamic range. More specifically, as illustrated in FIG. 14, each pixel 131 includes: an imaging cell (referred to below as high-saturation cell) 1321 that supports a high saturation; and an imaging cell for high sensitivity (referred to below as high-sensitivity cell) 1323.

High-saturation cell 1321 has a lower sensitivity than a sensitivity of high-sensitivity cell 1323.

High-saturation cell 1321 has a larger capacity than a capacity of high-sensitivity cell 1323, because charge storage nodes of high-saturation cell 1321 employ a metal oxide metal (MOM) capacity, for example.

High-sensitivity cell 1323 has a smaller capacity than the capacity of high-saturation cell 1321, because charge storage nodes of high-sensitivity cell 1323 do not employ the MOM capacity, for example. As a result, high-sensitivity cell 1323 can suppress reset noise by reducing random noise.

When vehicle V runs at night or inside a tunnel, microcomputer 177 performs the processes of FIG. 6 by using high-saturation cell 1321, which is one of high-saturation cell 1321 and high-sensitivity cell 1323 provided in each pixel 131. This can accurately detect a tail lamp or head lamp of another vehicle.

INDUSTRIAL APPLICABILITY

An imaging control device, an imaging control method, a program, and a recording medium in which the program is stored, according to the present disclosure, all make it possible to determine an appropriate exposure time and are suitable for a vehicular application accordingly.

REFERENCE MARKS IN THE DRAWINGS

1: imaging device
11: optical system
13: image sensor
131: pixel
1311: photoelectric converter
1311A: transparent electrode
1311B: pixel electrode
1311C: photoelectric conversion layer
1313: charge detection circuit
1315: semiconductor substrate
1317: interlayer insulating layer
1319: contact plug
1321: high-saturation cell
1323: high-sensitivity cell
133: row scanning circuit
135: column scanning circuit
137: voltage control circuit
15: image transmitter
17: system controller (imaging control device)
171: input section
173: program memory
P1: program
175: working memory
177: imaging-device-side microcomputer (microcomputer or controller)
179: output section
3: direction and distance-measuring sensor
5: electronic control unit (ECU)
51: information input section
53: image input section 55: program memory
P3: program
57: working memory
59: ECU-side microcomputer (microcomputer)
511: ECU-side output section
S: subject image (moving object image)
V vehicle (own vehicle)
V1: leading vehicle (target vehicle)
V2: following vehicle (target vehicle)

The invention claimed is:

1. An imaging control device comprising:
a controller that causes an image sensor to, during at least one first frame period, capture a multiple exposure image with a first exposure signal that contains a plurality of pulses having a plurality of pulse widths different from one another and display attribute setting signal that contains a plurality of display attributes having a plurality of pulse amplitudes different from one another, the image sensor being configured to perform the capturing by making multiple exposure; and
an input section that receives the multiple exposure image,
wherein the controller
performs an edge detection on a plurality of images of an identical subject appearing in the at least one multiple exposure image received by the input section, selects one pulse width from the plurality of pulse widths, the selected one pulse width being related to capturing of any image among the plurality of images, and
causes the image sensor to, during a second frame period, capture an image of the identical subject with a second exposure signal formed only of a pulse having the selected pulse width, the second frame period following the first frame period.

2. The imaging control device according to claim 1, wherein the at least one first frame period includes a plurality of first frame periods, a time interval being interposed between the plurality of first frame periods,
the controller;
during each of the plurality of first frame periods, causes the image sensor to capture the multiple exposure images with the plurality of exposure signal and display attribute setting signals, and
selects the one pulse width from the plurality of pulse widths, based on the multiple exposure image, corresponding to the plurality of first frame periods respectively, received by the input section.

3. The imaging control device according to claim 1, wherein both the image sensor and the imaging control device are installed in a vehicle, and the controller sets the plurality of pulse widths contained in the first exposure signal, at least based on a speed of the vehicle.

4. The imaging control device according to claim 1, wherein the controller
causes a pixel region in the image sensor to capture the multiple exposure image with the first exposure signal and the display attribute setting signal, the image region receiving light from a predetermined region to be noted, and
selects the one pulse width from the plurality of pulse widths, based on a plurality of images related to the identical subject contained in the region to be noted within the multiple exposure image received by the input section.

5. The imaging control device according to claim 4, wherein both the image sensor and the imaging control device are installed in a vehicle, and
the predetermined region to be noted is a region positioned in a moving direction of the vehicle.

6. The imaging control device according to claim 4, wherein both the image sensor and the imaging control device are installed in a vehicle, and
the predetermined region to be noted is positioned near a tail lamp of a leading vehicle and a head lamp of a following vehicle, the leading vehicle and the following vehicle being running along a traffic lane into which the vehicle attempts to move.

7. The imaging control device according to claim 1, wherein both the image sensor and the imaging control device are installed in a vehicle,
the image sensor has a plurality of pixels that include a high-sensitivity cell and a high-saturation cell, the high-saturation cell having a lower sensitivity than a sensitivity of the high-sensitivity cell but has a larger capacity in a charge storage node than a capacity of a charge storage node in the high-sensitivity cell, and
when the vehicle runs at night or inside a tunnel, the controller causes the high-saturation cell included in the image sensor to, during the first frame period, capture the multiple exposure image with the first exposure signal containing the plurality of pulses.

8. The imaging control device according to claim 1, wherein when both the image sensor and the imaging control device are installed in a vehicle, the controller sets periods of the plurality of pulses contained in the first exposure signal, based on a speed of the vehicle.

9. The imaging control device according to claim 1, wherein both the image sensor and the imaging control device are installed in a vehicle, and the controller sets at least one of the plurality of pulse widths and the plurality of periods of the pulses contained in the first exposure signal, based on an irradiation of an area containing the vehicle.

10. The imaging control device according to claim 1, wherein the controller further causes the image sensor to, during pilot frame periods, capture the multiple exposure image with the first exposure signal, the pilot frame periods regularly appearing, and
the controller
causes the image sensor to, during the first frame period between the pilot frame periods, capture the multiple exposure image with the first exposure signal and display attribute setting signal,
selects the one pulse width from the plurality of pulse widths, based on the multiple exposure image received by the input section, and causes the image sensor to, during a second frame period, capture an image of the identical subject with the second exposure signal, the second frame period following the first frame period.

11. A non-transitory recording medium in which a program is stored, the program causing a computer to perform a method comprising:
causing an image sensor to, during at least one first frame period, capture a multiple exposure image with a first exposure signal that contains a plurality of pulses having a plurality of pulse widths different from one another and display attribute setting signal that contains a plurality of pulses having a plurality of pulse amplitudes different from one another, the image sensor being configured to perform the capturing by making multiple exposure;

receiving the multiple exposure image;

performing an edge detection on a plurality of images of an identical subject appearing in the multiple exposure image received by the input section; selecting one pulse width from the plurality of pulse widths, the selected one pulse width being related to capturing of an image having a most sharply varying display attribute among the plurality of images; and causing the image sensor to, during a second frame period, capture an image of the identical subject with a second exposure signal formed only of a pulse having the selected pulse width, the second frame period following the first frame period.

12. The imaging control device according to claim 1, wherein the image sensor has a photoelectric converter, and the photoelectric converter has a photoelectric conversion layer made of an organic thin film.

13. The imaging control device according to claim 1, wherein the display attribute is at least one of brightness or color that is hue or chroma.

14. The imaging control device according to claim 1, wherein the first exposure signal and the display attribute setting signal are replaced to an identical signal.

15. An imaging control method comprising:

causing an image sensor to, during at least one first frame period, capture a multiple exposure image with a first exposure signal that contains a plurality of pulses having a plurality of pulse widths different from one another and display attribute setting signal that contains a plurality of display attributes having a plurality of pulse amplitudes different from one another, the image sensor being configured to perform the capturing by making multiple exposure;

receiving the multiple exposure image;

performing an edge detection on a plurality of images of an identical subject appearing in the at least one multiple exposure image received by the input section; selecting one pulse width from the plurality of pulse widths, the selected one pulse width being related to capturing of an image having a most sharply varying display attribute among the plurality of images; and causing the image sensor to, during a second frame period, capture an image of the identical subject with a second exposure signal formed only of a pulse having the selected pulse width, the second frame period following the first frame period.

16. The imaging control device according to claim 1, wherein the selected pulse width of the second exposure signal is one pulse width related to capturing of an image having a most sharply varying display attribute among the plurality of images.

17. An imaging control device that causes an image sensor to, during a frame period, capture by making multiple exposure that exposure by exposure time units and display attributes synchronized to the exposure time units respectively in each of the exposure time units, the imaging control device comprising:

a controller generating a first signal that indicates exposure time units having exposure time different from one another and a second signal that indicates degree different from one another corresponding to the exposure time units respectively, during a first frame period, being the frame period includes the first period or a second period following the first period;

an output section that connects the image sensor and outputs the generated signals to the image sensor; and an input section that connects the image sensor and receives the first multiple exposure image, wherein the controller performs an edge detection on a plurality of images of an identical subject appearing in the first multiple exposure image received by the input section, selects one exposure time unit from the exposure time units, the selected one pulse width being related to capturing of an image having a most sharply varying display attribute among the plurality of images;

generates a second exposure signal formed a pulse having only the selected exposure time unit during a second frame period; and causes the output section to output the second exposure to the image sensor.

18. The imaging control device according to claim 17, wherein the display attribute is at least one of brightness or color that is hue or chroma.

19. The imaging control device according to claim 17, wherein the first exposure signal and the display attribute setting signal are replaced to an identical signal.

* * * * *